United States Patent [19]
Nehm

[11] Patent Number: 5,195,552
[45] Date of Patent: Mar. 23, 1993

[54] CHECK VALVE WITH EXCHANGEABLE VALVING ELEMENTS

[75] Inventor: Holger Nehm, Müllheim, Fed. Rep. of Germany

[73] Assignee: Dieter Wildfang GmbH, Müllheim, Fed. Rep. of Germany

[21] Appl. No.: 785,690

[22] Filed: Oct. 31, 1991

[30] Foreign Application Priority Data

Dec. 8, 1990 [DE] Fed. Rep. of Germany ....... 4039280

[51] Int. Cl.⁵ .................. F16K 15/04; F16K 15/06
[52] U.S. Cl. ......................... 137/269; 137/533.11; 137/533.19; 137/533.21; 137/543
[58] Field of Search ............ 137/269, 533.11, 533.19, 137/533.21, 543, 533.13, 539.5, 540

[56] References Cited

U.S. PATENT DOCUMENTS

| | | | |
|---|---|---|---|
| 3,620,653 | 11/1971 | Gaylord | 137/533.15 X |
| 3,648,729 | 3/1972 | Balkany | 137/533.15 X |
| 3,664,368 | 5/1972 | Sweeney | 137/542 X |
| 3,902,518 | 9/1975 | Fischer | 137/533.21 X |
| 3,995,658 | 12/1976 | Hager | 137/543 |
| 4,203,466 | 5/1980 | Hager | 137/543 |
| 4,368,755 | 1/1983 | King | 137/540 X |
| 4,862,913 | 9/1989 | Wildfang | 137/543 |

Primary Examiner—Alan Cohan
Attorney, Agent, or Firm—Peter K. Kontler

[57] ABSTRACT

A check valve wherein the housing has an inlet and a seat at one end and an outlet at the other end. The other end can receive a removable and reinsertable cage which serves to confine a selected one of several spherical and/or otherwise configurated valving elements to movements between a sealing position of engagement with the seat to seal the inlet from the outlet and an inoperative position in which the housing, the selected valving element and the cage define a path for the flow of a fluid from the inlet toward, through and beyond the outlet. The inserted valving element is biased against the seat by a spring or by the fluid when the pressure of fluid at the outlet exceeds the pressure of fluid at the inlet.

29 Claims, 2 Drawing Sheets

CHECK VALVE WITH EXCHANGEABLE VALVING ELEMENTS

BACKGROUND OF THE INVENTION

The invention relates to check valves in general, for example, to check valves of the type described in commonly owned U.S. Pat. No. 4,862,913 granted Sep. 5, 1989 to Dieter Wildfang for "Check Valve".

The patent to Wildfang discloses a check valve wherein a tubular housing confines an annular seat adjacent the inlet and a cage at the outlet. The cage serves to retain in the housing a reciprocable valving element which is biased against the seat by a spring but can yield to establish a path for the flow of fluid from the inlet toward and into the outlet when the pressure of fluid at the inlet suffices to overcome the bias of the spring. The spring reacts against the cage.

It is also known to employ a spherical valving element which is confined in the housing of a check valve and is movable toward and away from sealing engagement with a seat in the housing. The spherical valving element may but need not be biased toward the seat.

Presently known check valves are constructed and assembled in such a way that they can be put to specific uses, i.e., it is necessary to provide a selection of different check valves each of which can be used under a particular set of circumstances. For example, a first check valve can employ a spherical valving element which is capable of floating on a body of liquid in the housing of the check valve and is caused to sealingly engage the seat when the pressure at the outlet exceeds the pressure at the inlet of the housing. Another check valve can employ a relatively heavy spherical valving element which tends to sink and to thus move away from or against the seat. A further check valve can be designed in a manner as disclosed in the aforementioned patent to Wildfang, i.e., a coil spring can be used to bias a reciprocable nonspherical valve element toward its seat. The means for confining the valving element in the housing of a conventional check valve also vary from valve to valve, depending upon the shape and/or other characteristics of the valving element. All this contributes to the cost of the valves and to the cost of storing a variety of different check valves.

OBJECTS OF THE INVENTION

An object of the invention is to provide a novel and improved multiple-purpose check valve.

Another object of the invention is to provide a novel and improved housing for use in the multiple-purpose check valve.

A further object of the invention is to provide novel and improved valving elements for use in the above outlined valve.

An additional object of the invention is to provide novel and improved means for movably confining a valving element in the housing of the above outlined multiple-purpose check valve.

Still another object of the invention is to provide a convertible check valve which can be set up for uses under different circumstances without necessitating removal of the housing from a pipeline or the like.

A further object of the invention is to provide a battery of valving elements for selective use in the above outlined multiple-purpose convertible check valve.

Another object of the invention is to provide a check valve which is capable of performing the functions of an entire set of different conventional check valves.

An additional object of the invention is to provide a check valve which can be rapidly converted for use under a number of different circumstances.

Another object of the invention is to provide a novel and improved method of converting a check valve for use under different sets of circumstances.

An additional object of the invention is to provide a conduit, a pipeline, a hydraulic or pneumatic circuit or another part or system which employs one or more multiple-purpose valves of the above outlined character.

Still another object of the invention is to provide a simple and inexpensive check valve which can be rapidly converted for any one of a number of different uses by resorting to rudimentary and readily available tools.

A further object of the invention is to provide a novel and improved method of reducing the cost of storing check valves.

An additional object of the invention is to construct the above outlined multiple-purpose valve in such a way that its selected valving element offers little resistance to the flow of a fluid through the housing when the valving element is held in the inoperative position out of sealing engagement with the seat.

A further object of the invention is to provide a check valve which permits the flow of large quantities of fluid per unit of time through a relatively small housing.

SUMMARY OF THE INVENTION

The invention is embodied in a check valve which comprises a substantially tubular housing having a fluid-admitting inlet at one end and a fluid-discharging outlet at the other end, a seat which is provided in the housing at the inlet and has an annular sealing surface, a cage which is removably and reinsertably installed in the housing and includes a stop between the seat and the outlet, and a plurality of interchangeable discrete valving elements a selected one of which is insertable into the housing upon at least partial removal of the cage. The inserted selected valving element is confined in the housing—upon reinsertion of the cage—to movements between a sealing position in which the inserted valving element sealingly engages the surface of the seat to prevent penetration of a fluid into the housing through the inlet and beyond the seat, and an inoperative position in which the inserted valving element is remote from the seat and is at least close to the stop of the cage to define with the housing and with the cage a path for the flow of a fluid through the housing from the inlet toward, through and beyond the outlet.

The surface of the seat is or can constitute a substantially concave surface, and each valving element can be provided with a complementary convex surface which engages the concave surface of the seat in the sealing position of the inserted valving element.

The valve further comprises means for separably coupling the cage to the housing in the reinserted position of the cage.

The valving elements can include at least one hollow or solid spherical valving element. The at least one spherical valving element can constitute a float or it can have a tendency to sink in the fluid which fills the housing.

The valving elements can further include at least one valving element having a first portion which is engageable with the seat and a resilient portion which reacts against the cage and biases the first portion against the seat upon insertion of the at least one valving element into the housing and subsequent to reinsertion of the cage into the housing.

Each valving element can include a first part which is located at the seat in the sealing position of the respective (inserted) valving element, a second part which is located at the stop at least in the inoperative position of the respective (inserted) valving element, and a third part between the first and second parts. The third part of any one valving element is preferably identical or substantially identical with the third part of each other valving element.

Each valving element can be provided with an at least partly spherical external surface which is adjacent the stop in the inoperative position of the respective valving element, and the stop of the cage has an external surface which is substantially tangential to the external surface of the inserted valving element in the inoperative position of such valving element.

The cage can further comprise a first annular section at the stop, a plurality of webs which connect the stop with the first annular section, a second annular section which is located at the seat upon reinsertion of the cage, and a plurality of connectors between the annular sections.

An internal surface of the housing at least partially surrounds the reinserted cage, and the second annular section of the cage has an inner surface which diverges from the surface of the seat toward the internal surface of the housing in a direction from the seat toward the outlet upon reinsertion of the cage into the housing. The second annular section of the cage can be provided with a shoulder which is adjacent the inner surface and is remote from the seat in reinserted position of the cage. The shoulder then extends substantially radially outwardly from the inner surface of the second annular section of the cage toward the internal surface of the housing. The external surface of each valving element can include a portion which is substantially complementary to and is spaced apart from the inner surface of the second annular section in the inoperative position of the respective valving element and upon reinsertion of the cage.

The housing and the selected inserted valving element preferably define a substantially unobstructed path for the flow of a fluid from the inlet, through the seat and toward, through and beyond the outlet in the inoperative position of the inserted valving element and in reinserted position of the cage. The cross-sectional area of at least a portion of the path can decrease in a direction from the inlet toward the outlet of the housing. To this end, the path can include a constriction which surrounds the inserted selected valving element in the inoperative position of the inserted valving element.

At least one of the valving elements can include a first portion having an elongated shank and the stop can be provided with a substantially centrally located passage which reciprocably receives the shank in the inserted position of the at least one valving element and upon reinsertion of the cage. The first annular section of the cage is preferably concentric with and spacedly surrounds the stop, and the aforementioned webs connect the first annular section with the stop and establish channels for the flow of a fluid toward and into the outlet in the inoperative position of the inserted selected valving element.

The first annular section of the cage can be provided with an inner surface which diverges toward the internal surface of the housing in a direction from the outlet toward the seat.

The stop can be provided with an internal surface which substantially conforms to and is at least closely adjacent the external surface of the inserted valving element in the inoperative position of the inserted valving element and in reinserted position of the cage.

As already mentioned above, at least one valving element can include a first portion which is engageable with the seat and a resilient portion which reacts against the reinserted cage and biases the first portion toward the seat. The stop can be provided with a socket, and the resilient portion of the at least one valving element can include an end which extends into the socket when the at least one valving element is inserted into the housing and the cage is thereupon reinserted into the housing. The first portion of the at least one valving element can include a first part which engages the surface of the seat in the sealing position of the at least one valving element, a second part which is at least closely adjacent the stop at least in the inoperative position of the at least one valving element, and a substantially spherical part between the first and second parts. Furthermore, the first portion of the at least one valving element can be provided with a substantially plane surface which is adjacent the seat and faces the inlet in the sealing position of the at least one valving element. The shank of the first portion extends toward the outlet in inserted position of the at least one valving element, and such first portion can be provided with an annular socket which surrounds the shank. The resilient portion of the at least one valving element reacts against the stop and bears against the first portion in the socket. The shank can constitute a tube (i.e., it can be hollow) a portion of which extends beyond the socket of the first portion of the at least one valving element. The resilient portion can include a coil spring which surrounds the shank.

The housing can be provided with an internal annular groove for a part of or the entire second annular section of the cage. The second annular section and/or the housing can be provided with a cam face which urges the aforementioned part of the second annular section radially outwardly in response to reinsertion of the cage into the housing.

The seat can include an annular sealing element which is received in the housing, and the second annular section of the cage can be used to maintain the sealing element in a predetermined position in response to reinsertion of the cage into the housing. The latter can be provided with an annular recess for the sealing element, and such recess can include an open side which faces toward the outlet of the housing and is adjacent the second annular section of the cage when the latter is reinserted into the housing.

The novel features which are considered as characteristic of the invention are set forth in particular in the appended claims. The improved check valve itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
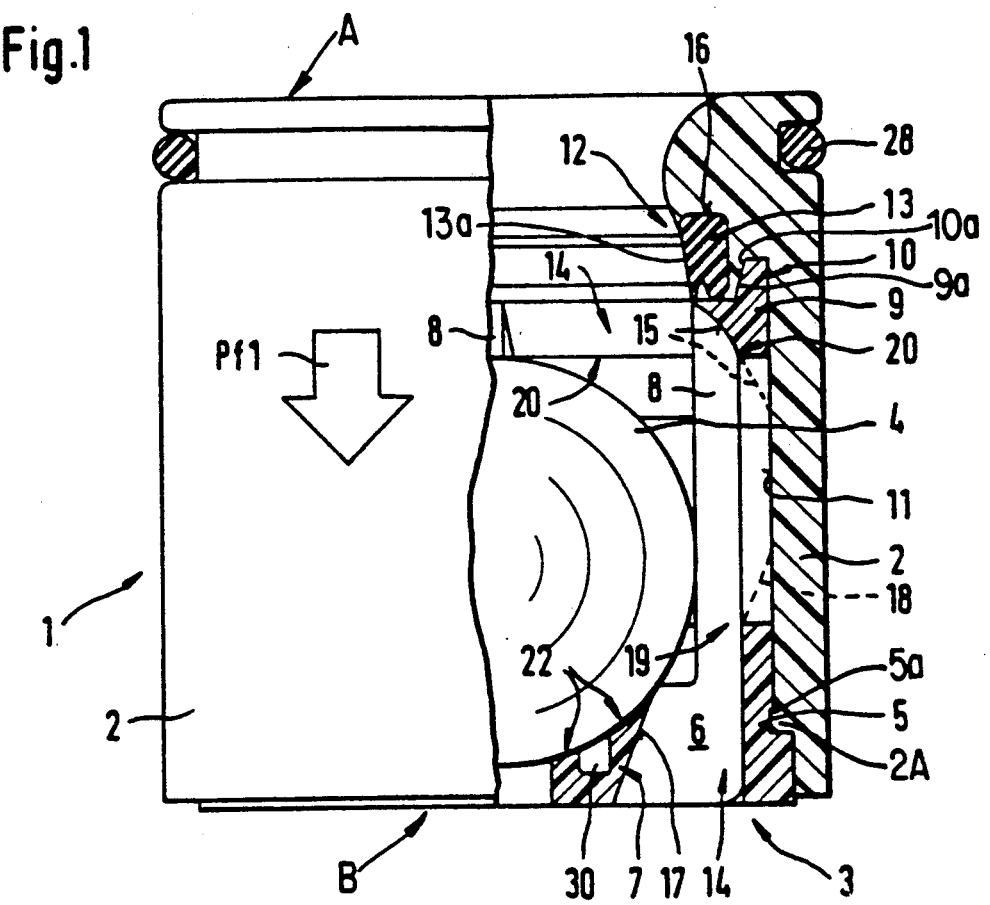
FIG. 1 is a partly elevational and partly axial sectional view of a check valve which embodies one form of the invention and wherein the selected valving element is a sphere which is shown in the inoperative position.

Referring first to FIG. 1, there is shown a check valve 1 which can be installed in a pipeline, not shown, wherein a gaseous or hydraulic fluid can flow in the direction of arrow Pf1 (namely from an inlet A at one end toward, through and beyond an outlet B at the other end of a tubular housing 2) but not in the opposite direction. A seat 12 at the inlet A comprises an annular sealing element 13 which is received in an internal annular recess 16 of the housing, and the recess 16 has an open side which faces toward the outlet B.

A specially designed cage or guide 3 is removably and reinsertably installed in the housing 2 at the outlet B and includes a centrally located abutment or stop 7 for a hollow or solid spherical valving element 4 which is shown in the inoperative position, namely away from sealing engagement with the preferably concave inner surface 13a of the sealing element 13 of the seat 12 and in contact with a concave inner surface 22 of the stop 7. When the pressure at the outlet B rises above the pressure at the inlet A, the fluid at the outlet B compels the valving element 4 to move upwardly (as viewed in FIG. 1) so that its spherical external surface engages the preferably complementary concave inner surface 13a of the sealing element 13. This is the sealing position of the valving element 4, and the valve 1 then prevents any flow of fluid in a direction from the outlet B toward the inlet A.

The cage 3 further comprises a first annular section 5 which is releasably coupled to the housing 2, a plurality of substantially radially extending portions in the form of webs 6 which connect the stop 7 with and center the stop relative to the first annular section 5, a second annular section 9 which is adjacent the open side of the recess 16 to confine the sealing element 13 in such recess, and a plurality of axially parallel finger-like connectors 8 between the annular sections 5 and 9. The second annular section 9 of the cage 3 can be said to constitute a flow stabilizing element and is provided with a concave inner surface 15 having a curvature which is preferably complementary to that of the external surface of the spherical valving element 4. The external surface of the valving element 4 sealingly engages the inner surface 13a of the sealing element 13 but not the surface 15 when the valving element is compelled to assume its sealing position.

The means for releasably coupling the cage 3 to the housing 2 includes an internal annular protuberance 2A which projects from the cylindrical internal surface 11 of the housing 2 at the outlet B, and a rather shallow complementary external groove 5a of the first annular section 5. The protuberance 2A can be received in the groove 5a by snap action. It is clear that a more reliable coupling can be used to hold the cage 3 in the reinserted position of FIG. 1 if the pressure of a fluid in the direction of arrow Pf1 is very pronounced so that the valving element 4 would be likely to dislodge or even expel the cage 3 by bearing against the concave inner surface 22 of the stop 7 in the illustrated inoperative position of the valving element. For example, screws, radial pins or other retaining devices can be used to secure the cage 3 in the reinserted position.

It is desirable to design the cage 3 in such a way that it can be removed from and reinserted into the housing 2 by way of the outlet B. A recess 10 in the housing 2 and the annular section 9 of the cage 3 are respectively provided with cooperating cam faces 9a and 10a to cause a certain radially outward spreading of that part of the annular section 9 which enters the recess 10 to thus ensure the establishment of a reliable sealing contact between the external surface of the annular section 9 and the internal surface 11 of the housing 2. Such sealing engagement is established in automatic response to introduction of the upper part (as viewed in FIG. 1) of the annular section 9 into the recess 10.

Figure 2:
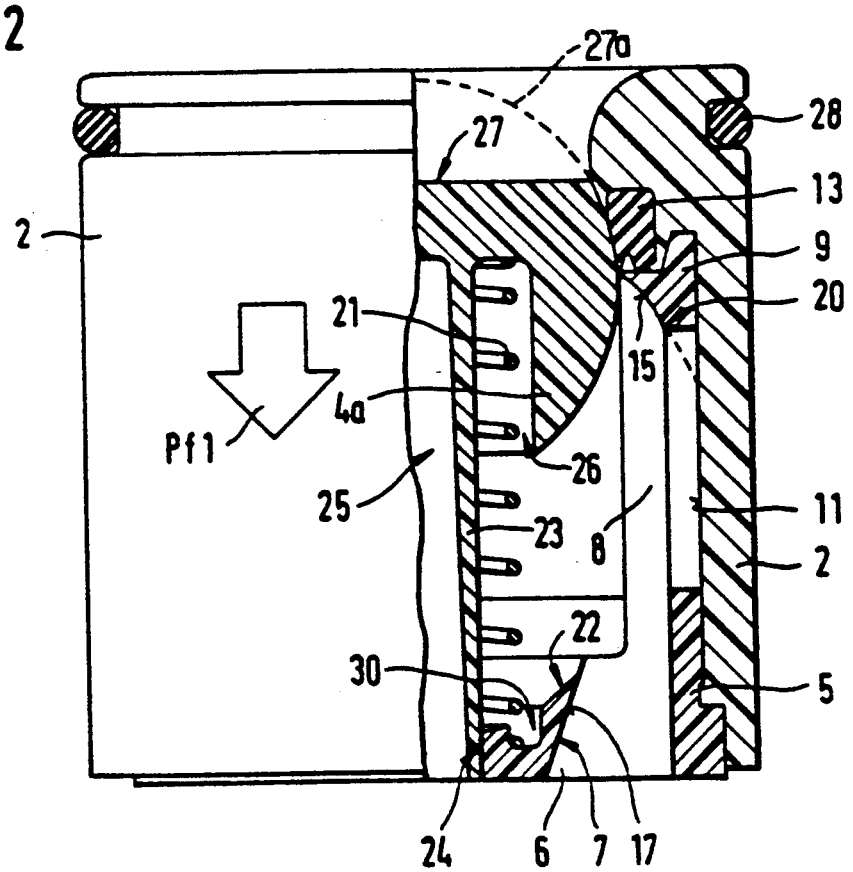
FIG. 2 is a similar view of the check valve but with a reciprocable valving element which is shown in the sealing position.

An important advantage of the housing 2 and of the cage 3 is that the housing can receive and the cage can confine any one of a series of different valving elements. FIG. 2 shows a valving element 4a which is reciprocable between the sealing position of FIG. 2 and an inoperative position shown in FIG. 3 (in a slightly modified housing 2a). The valving element 4a includes a first part which is adjacent a plane front surface 27 and can be moved into sealing engagement with the inner surface 13a of the annular sealing element 13 of the seat 12, a second part which can be moved into engagement with the inner surface 22 of the stop 7, and an intermediate part having a convex surface with a radius of curvature corresponding to that of the external surface of the spherical valving element 4 of FIG. 1 and being located between the first and second parts. This ensures that, when the valving element 4a is moved to the inoperative position of FIG. 3, its third part and the internal surface 11 of the housing 2 or 2a define a path 14 for substantially unobstructed flow of a fluid from the inlet A toward the outlet B. At such time, the third part of the valving element 4a (or the corresponding part of a spherical valving element 4) defines with the internal surface 11 of the housing an annular constriction 19 which preferably constitutes the narrowest portion of the aforementioned path 14.

Figure 3:
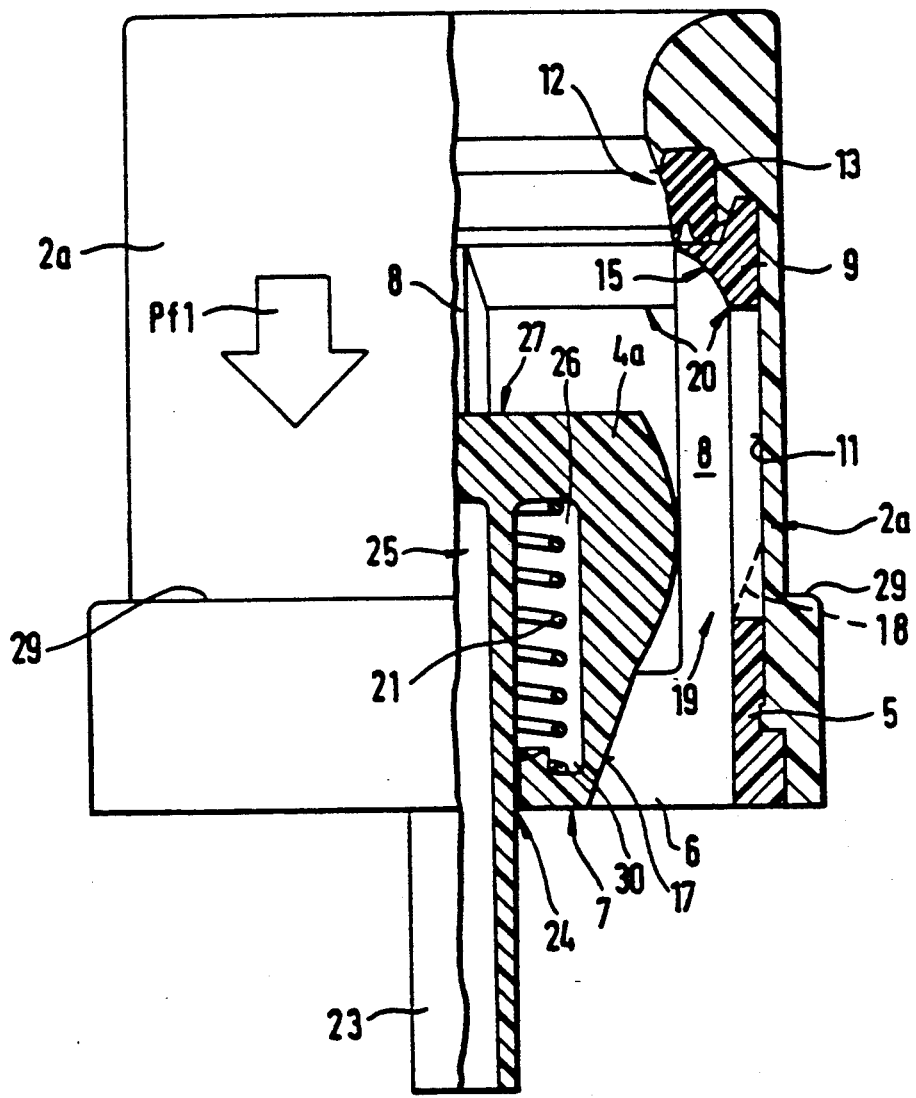
FIG. 3 is a view similar to that of FIG. 2 but showing the reciprocable valving element in the inoperative position relative to a slightly modified housing.

An advantage of the improved check valve 1 is that one and the same housing 2 or 2a, as well one and the same cage 3, can be used in combination with an assortment of different valving elements including the spherical valving element 4 of FIG. 1 and the reciprocable valving element 4a of FIGS. 2 and 3. Thus, all that is necessary to convert the check valve 1 of FIG. 1 into the check valve of FIG. 2 is to disengage the coupling 5a, 2A between the annular section 5 of the cage 3 and the housing 2, withdraw the cage 3 from the housing 2 by way of the outlet B, withdraw the spherical valving element 4, insert the reciprocable valving element 4a, and reinsert the cage 3. Reconversion of the check valve of FIG. 2 into the check valve 1 of FIG. 1 is equally simple and can be completed by utilizing rudimentary tools. For example, all that is necessary is to push the spherical valving element 4 against the stop 7 of FIG. 1 with a force which suffices to disengage the coupling 5a, 2A so that the valving element 4 and the cage 3 are expelled from the housing 2 preparatory to insertion of the valving element 4a and reinsertion of the cage 3. Analogously, the operator can exert a force against the plane surface 27 of the valving element 4a of FIG. 2 in order to move this valving element to the inoperative position of FIG. 3 and thereupon expel the cage 3 and the valving element 4a from the housing 2 or 2a preparatory to insertion of the spherical valving element 4 or of a third or fourth valving element, not shown. Thus, instead of maintaining in storage a large supply of complete check valves, the organization in charge of making and/or selling check valves merely maintains a small supply of housings 2 or 2a and assortments of two, three, four or more different valving elements. Each such assortment can include a hollow spherical valving element, a solid spherical valving element, a solid or hollow spherical valving element which can float in the fluid within the housing 2 or 2a, a solid or hollow spherical valving element which is made of a material with a specific weight such that the valving element sinks when inserted into a body of fluid which is to pass through the housing 2 or 2a, a valving element 4a and/or others. The exact configuration and/or other characteristics of the assortment of valving elements which will be furnished with a housing 2 or 2a depends on the intended uses of the check valve.

It is often desirable to employ a check valve which has a relatively small housing but is capable of permitting the flow of large quantities of a fluid per unit of time when the selected valving element is maintained in the inoperative position, i.e., in engagement with or close to the concave inner surface 22 of the stop 7. The illustrated check valve is ideally suited for such purposes due to the establishment of the aforediscussed path 14 for the flow of a large quantity of fluid from the inlet A, through the seat 12, and toward and through and beyond the outlet B when the valving element 4 or 4a (or another selected valving element) is maintained in the inoperative position. The spherical external surface of the valving element 4 or the spherical external surface of the third part of the valving element 4a offers little resistance to the flow of a fluid from the seat 12 toward the outlet B when the selected valving element is maintained in the inoperative position. The inner surface 13a of the annular sealing element 13, the inner surface 15 of the annular section 9 of the cage 3, and the internal surface 11 of the housing 2 or 2a also contribute to the establishment of a smooth flow of fluids from the inlet A toward and beyond the outlet B in the inoperative position of the selected valving element. The curvature of the surface 15 can be complementary to the curvature of the external surface of the adjacent part of the valving element 4 or 4a so that, when the valving element is held in the inoperative position, the corresponding portion of the path 14 is bounded by a spherical surface (of the valving element) at the inside and by a complementary conical surface 15 at the outside. Furthermore, and as already mentioned above, the curvature of the inner surface 13a of the annular sealing element 13 can be such that it is complementary to the curvature of the adjacent portion of the external surface of the valving element 4 or 4a when the latter is held in the sealing position, i.e., in engagement with the seat. The substantially conical external surface 17 of the stop 7 is preferably tangential to the adjacent portion of the external surface of the valving element 4 or 4a when the valving element is held in the inoperative position in which a portion of its external surface preferably lies flush against the concave inner surface 22 of the stop 7. This reduces the likelihood of turbulence and noisy flow of a fluid through the housing 2 or 2a.

The inner surface 15 of the annular section 9 of the cage 3 diverges in a direction from the sealing element 13 of the seat 12 toward the internal surface 11 of the housing 2 or 2a. The annular section 5 of the cage 3 can be provided with a concave surface (indicated in FIG. 1 by a broken line, as at 18) which eliminates an obstruction along the outer side of the path 14 in the inoperative position of the selected valving element.

When the cage 3 is properly inserted into and is coupled to the housing 2 or 2a, its annular section 9 overlies the open side of the recess 16 for the sealing element 13 to thus ensure that this sealing element is held in an optimum position for engagement by the valving element 4 or 4a when the valving element is caused to assume its operative or sealing position corresponding to the position of the valving element 4a in FIG. 2. At such time, the inner surface 15 constitutes an extension of the inner surface 13a and cooperates with the internal surface 11 and concave surface 18 to ensure predictable flow of large quantities of a fluid from the inlet A toward, through and beyond the outlet B in the inoperative position of the selected valving element.

The external surface 17 of the stop 7 cooperates with the adjacent portion of the external surface of the valving element 4 or 4a to establish a smooth boundary along the inner side of the path 14 when the selected valving element is maintained in the inoperative position, i.e., in a position of abutment with the inner surface 22 of the stop 7.

The constriction 19 of the path 14 is preferably located at least slightly downstream of the maximum-diameter portion of the valving element 4 or 4a (or another valving element) when the valving element is in engagement with the sealing element 13 of the seat 12. The valving element 4 can slide or roll and the valving element 4a can slide along the inner surfaces of the axially parallel finger-like connectors 8 of the cage 3 when the latter is properly reinserted into the housing 2 or 2a. This ensures predictable guidance of the selected valving element during movement between its sealing and inoperative positions and the establishment of optimal flow conditions when the selected valving element abuts or is at least close to the inner surface 22 of the stop 7. The purpose of the constriction 19 is to effect an acceleration of the flow of fluid in the respective portion of the housing 2 or 2a and a corresponding reduction of pressure. This results in the development of suction which acts upon the selected valving element and urges the latter toward the stop 7 to thus reduce the likelihood of undesirable or uncontrolled movement of the valving element toward sealing engagement with the element 13 of the seat 12. Such suction forces are desirable and advantageous because the valving element is highly unlikely to perform vibratory and/or other stray movements at a time when it is expected to abut the surface 22 of the stop 7. Vibrations and resulting repeated striking of the selected valving element against the stop 7 could generate noise and would be likely to reduce the rate of flow of fluid from the inlet A toward the outlet B at a time when the improved check valve is to offer minimal resistance to the flow of fluid through the housing 2 or 2a. In addition, any stray movements of the selected valving element in the housing 2 or 2a could result in extensive wear upon the housing and/or upon the selected valving element and/or upon the cage 3.

Experiments with the improved check valve indicate that it is desirable to provide the annular section 9 of the cage 3 with an annular shoulder 20 which extends substantially at right angles to the axis of the housing 2 or 2a in a direction from the radially outermost portion of the inner surface 15 of the section 9 toward the internal surface 11 of the housing. Such shoulder enables the fluid flowing from the inlet A toward the outlet B to exert upon the selected valving element an additional force which urges the valving element against the stop 7 to thus prevent any stray movements of the valving element when the latter is to be maintained in the inoperative position. Moreover, the shoulder 20 enables the check valve to permit the flow of a larger quantity of fluid per unit of time when the valving element is held in the inoperative position. It was also found that the shoulder 20 does not cause the development of turbulence and/or noise when the selected valving element abuts the stop 7. The shoulder 20 can terminate short of the internal surface 11 of the housing 2 or 2a.

As already mentioned above, the valving element 4a of FIGS. 2 and 3 can be said to include three parts which are integral with each other, one of which is adjacent the plane surface 27, another of which is intended to engage the inner surface 22 of the stop 7 and the third of which is located between the one part and the other part. This valving element can also be said to include a one-piece first portion (such portion includes the partly spherical head which is adjacent the plane surface 27 and a centrally located hollow tubular shank 23) and a resilient second portion here shown as a coil spring 21. The coil spring 21 surrounds the shank 23. One end of the coil spring 21 extends into an annular socket 26 of the one-piece first portion to bias the first portion toward engagement with the seat 12, and the other end extends into a socket 30 of the stop 7. The stop 7 has a central passage 24 for a portion of the shank 23. The blind axial bore or hole of the shank 23 is shown at 25. The socket 30 extends from the radially innermost portion of the concave inner surface 22 of the stop 7 and can be said to constitute a short blind bore or hole of the stop. The spring 21 reacts against the stop 7 and urges the first portion of the valving element 4a deeper into the housing 2 or 2a, namely toward engagement with the surface 13a of the sealing element 13.

An advantage of the socket 26 in the first portion of the valving element 4a is that a substantial part of the coil spring 21 can be concealed therein and that the axial length of the valving element 4a can be reduced accordingly. Moreover, the spring 21 is properly guided in each axial position of the valving element 4a. The bias of the selected spring 21 will determine the force with which the head of the first portion of the valving element 4a is urged toward engagement with the sealing element 13 of the seat 12. The valving element 4a can comprise a very weak spring 21 which offers small or negligible resistance to movement of this valving element to the position of FIG. 3. The reason is that the spring 21 need not prop or otherwise support the valving element 4a in the position of FIG. 3 because the valving element then abuts the complementary inner surface 22 of the stop 7.

As indicated in FIG. 2 by a broken line 27a, of the first portion of the valving element 4a can be enlarged (i.e., the surface 27 can be omitted) so that such head even more closely resembles the spherical valving element 4 of FIG. 1. Thus, the illustrated valving element 4a can be replaced with a valving element which is basically a sphere with the exception that it comprises a shank 23 and a socket 26 for a portion of the coil spring 21.

The plane surface 27 is preferably dimensioned and positioned in such a way that it is immediately or closely adjacent the sealing element 13 of the seat 12 when the valving element 4a is caused or permitted to assume the sealing position of FIG. 2. This plane surface 27 can be replaced with a concave or with an otherwise configurated surface without departing from the spirit of the invention. The purpose of the plane surface 27 (or of an equivalent of such plane surface) is to ensure that the valving element 4a is capable of immediately responding to a rise of fluid pressure at the inlet A so that the valving element is immediately or rapidly shifted to and remains in the inoperative position of FIG. 3. In other words, even a small pressure differential between the inlet A and the interior of the housing 2 or 2a suffices to ensure that the valving element 4a will leave its sealing position and will immediately move all the way into engagement with the stop 7. Rapid or abrupt movement of the valving element 4a from the sealing position of FIG. 2 to the inoperative position of FIG. 3 also reduces the likelihood of fluttering, vibration and/or other stray movements of the valving element on its way toward abutment with the surface 22 of the stop 7.

The housing 2 of FIGS. 1 and 2 can be installed in a conduit and its external surface is provided with at least one circumferential groove for a ring-shaped sealing element 28. The housing 2a of FIG. 3 has an external shoulder 29 so that it can be said to resemble a cartridge which is insertable into one end portion of a pipe or another conduit not unlike the cartridge of a water meter.

The axially parallel connectors 8 of the cage 3 preferably merge into the adjacent radially extending webs 6 between the stop 7 and the annular section 5. This ensures that the connectors 8 and the webs 6 offer less resistance to the flow of a fluid from the inlet A toward, through and beyond the outlet B.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A check valve comprising a substantially tubular housing having a fluid-admitting inlet and a fluid-discharging outlet; a seat provided in said housing at said inlet and having an annular sealing surface; a cage removably and reinsertably installed in said housing and including a stop between said seat and said outlet, said housing having an internal surface at least partially surrounding said cage upon reinsertion of said cage, and said cage further having an annular section which is adjacent said seat upon reinsertion of said cage, said annular section having an inner surface which diverges from the surface of said seat toward said internal surface in a direction from said seat toward said outlet; and a plurality of interchangeable discrete valving elements a selected one of which is insertable into said housing upon at least partial removal of said cage, the inserted valving element being confined in said housing—upon reinsertion of said cage—to movements between a sealing position in which the inserted valving element sealingly engages said surface of said seat to prevent penetration of a fluid into said housing through said inlet and beyond said seat, and an inoperative position in which the inserted valving element is remote from said seat and is at least close to said stop to define with said housing and said cage a path for the flow of a fluid through said housing from said inlet toward, through and beyond said outlet.

2. The check valve of claim 1, wherein said annular section has a shoulder adjacent said inner surface and remote from said seat upon reinsertion of said cage, said shoulder then extending substantially radially outwardly from said inner surface toward said internal surface.

3. The check valve of claim 1, wherein each of said valving elements has an external surface having a portion which i substantially complementary to and is spaced apart from said inner surface in the inoperative position of the respective valving element.

4. A check valve comprising a substantially tubular housing having a fluid-admitting inlet and a fluid-discharging outlet; a seat provided in said housing at said inlet and having an annular sealing surface; a cage removably and reinsertably installed in said housing and including a stop between said seat and said outlet, said cage further comprising an annular section at said outlet, and means for connecting said annular section with the said stop, said housing having an internal surface surrounding at least a portion of said annular section, and said annular section having an inner surface which diverges toward said internal surface in a direction from said outlet toward said seat; and a plurality of interchangeable discrete valving elements a selected one of which is insertable into said housing upon at least partial removal of said cage, the inserted valving element being confined in said housing—upon reinsertion of said cage—to movements between a sealing position in which the inserted valving element sealingly engages said surface of said seat to prevent penetration of a fluid into said housing through said inlet and beyond said seat, and an inoperative position in which the inserted valving element is remote from said seat and is at least close to said stop to define with said housing and said cage a path for the flow of a fluid through said housing from said inlet toward, through and beyond said outlet.

5. A check valve comprising a substantially tubular housing having a fluid-admitting inlet and a fluid-discharging outlet; a seat provided in said housing at said inlet and having an annular sealing surface; a cage removably and reinsertably installed in said housing and including a stop between said seat and said outlet; and a plurality of interchangeable discrete valving elements a selected one of which is insertable into said housing upon at least partial removal of said cage, the inserted valving element being confined in said housing—upon reinsertion of said cage—to movements between a sealing position in which the inserted valving element sealingly engages said surface of said seat to prevent penetration of a fluid into said housing through said inlet and beyond said seat, and an inoperative position in which the inserted valving element is remote from said seat and is at least close to said stop to define with said housing and said cage a path for the flow of a fluid through said housing from said inlet toward, through and beyond said outlet, at least one of said valving elements including a first portion and a resilient portion which biases said first portion toward said seat when said at least one valving elements in inserted into said housing and said cage is thereafter reintroduced into said housing, said first portion including a shank which extends toward said outlet in the inserted position of said at least one valving element, and said first portion having an annular socket surrounding said shank, said resilient portion reacting against said stop and bearing against said first portion in said socket, and said shank being hollow and including a portion extending beyond said socket, said resilient portion including a coil spring which surrounds said shank.

6. A check valve comprising a substantially tubular housing having a fluid-admitting inlet and a fluid-discharging outlet; a seat provided in said housing at said inlet and having an annular sealing surface; a cage removably and reinsertably installed in said housing and including a stop between said seat and said outlet, said cage further including an annular section located in said housing adjacent said seat, and said housing having an internal annular recess which receives at least a part of said annular section, said annular section and said housing having cooperating cam faces which urge said part of said annular section radially outwardly in response to reinsertion of said cage into said housing; and a plurality of interchangeable discrete valving elements and a selected one of which is insertable into said housing upon at least partial removal of said cage, the inserted valving element being confined in said housing—upon reinsertion of said cage—to movements between a sealing position in which the inserted valving element sealingly engages said surface of said seat to prevent penetration of a fluid into said housing through said inlet and beyond said seat, and an inoperative position in which the inserted valving element is remote from said seat and is at least close to said stop to define with said housing and said cage a path for the flow of a fluid through said housing from said inlet toward, through and beyond said outlet.

7. The check valve of claim 6, wherein said surface of said seat is a substantially concave surface and each valving element has a complementary convex surface which engages the concave surface in the sealing position of the inserted valving element.

8. The check valve of claim 6, further comprising means for separably coupling said cage to said housing.

9. The check valve of claim 6, wherein said valving elements include a spherical valving element.

10. The check valve of claim 6, wherein said valving elements include at least one valving element having a first portion engageable with said seat and a resilient portion which reacts against said cage and biases said first portion toward said seat upon insertion of said at least one valving element into said housing and subsequent to reinsertion of said cage into said housing.

11. The check valve of claim 6, wherein each of said valving elements has a first part which is located at said seat in the sealing position of the respective valving element, a second part which is located at said stop in the inoperative position of the respective valving element, and a third part between the respective first and second parts, the third part of any one of said valving elements being at least substantially identical with the third part of each other valving element.

12. The check valve of claim 6, wherein each of said valving elements has an at least partly spherical external surface which is adjacent said stop in the inoperative position of the respective valving element, said stop having an external surface which is substantially tangential to the external surface of an inserted valving element in the inoperative position of such valving element.

13. The check valve of claim 6, wherein said cage further comprises a first annular section at said stop, a plurality of webs connecting said stop with said first annular section, a second annular section at said seat upon reinsertion of said cage, and a plurality of connectors between said annular sections.

14. The check valve of claim 6, wherein said housing and the inserted valving element define a substantially unobstructed path for the flow of a fluid from said inlet, through said seat and toward, through and beyond said outlet in the inoperative position of the inserted valving element.

15. The check valve of claim 14, wherein the cross-sectional area of at least a portion of said path decreases in a direction from said inlet toward said outlet.

16. The check valve of claim 14, wherein said path has a constriction which surrounds the inserted valving element in the inoperative position of such valving element.

17. The check valve of claim 6, wherein at least one of said valving elements has an elongated shank and said stop has a substantially centrally located passage which reciprocably receives the shank in the inserted position of said at least one valving element and upon reinsertion of said cage.

18. The check valve of claim 17, wherein said cage further comprises an annular section and webs connecting said annular section with said stop, said stop being surrounded by and being located substantially centrally of said annular section.

19. The check valve of claim 6, wherein each of said valving elements has an external surface and said stop has an inner surface which substantially conforms to and is at least closely adjacent the external surface of the inserted valving element in the inoperative position of the inserted valving element.

20. The check valve of claim 6, wherein at least one of said valving elements has a first portion engageable with said seat and a resilient portion which reacts against said cage and biases said first portion toward said seat upon insertion of said at least one valving element into said housing and subsequent to reinsertion of said cage, said stop having a socket and said resilient portion including an end which extends into said socket when said at least one valving element is inserted into said housing and the cage is thereafter reintroduced into said housing.

21. The check valve of claim 6, wherein at least one of said valving elements includes a first portion and a resilient portion which reacts against said cage and biases said first portion toward said seat upon insertion of said at least one valving element and subsequent to reintroduction of said cage, said first portion including a first part which engages said surface of said seat in the sealing position of said at least one valving element, a second part which is at least closely adjacent said stop in the inoperative position of said at least one valving element, and a substantially spherical part between said first and second parts.

22. The check valve of claim 6, wherein at least one of said valving elements includes a first portion and a resilient portion which biases said first portion toward said seat when said at least one valving element is inserted into said housing and said cage is thereafter reintroduced into said housing, said first portion having a substantially plane surface which is adjacent said seat and faces said inlet in the sealing position of said at least one valving element.

23. The check valve of claim 6, wherein at least one of said valving elements includes a first portion and a resilient portion which biases said first portion toward said seat when said at least one valving element is inserted into said housing and said cage is thereafter reintroduced into said housing, said first portion including a shank which extends toward said outlet in the inserted position of said at least one valving element, and said first portion having an annular socket surrounding said shank, said resilient portion reacting against said stop and bearing against said first portion in said socket.

24. The check valve of claim 6, wherein said seat includes an annular sealing element which is received in said housing, said cage including an annular section which maintains said sealing element in a predetermined position in response to reinsertion of said cage into said housing.

25. The check valve of claim 24, wherein said housing has an annular recess for said sealing element, said recess having an open side facing said outlet and said annular section being adjacent the open side of said recess upon reinsertion of said cage into said housing.

26. The check valve of claim 6, wherein at least one of said valving elements includes a hollow sphere.

27. The check valve of claim 6, wherein at least one of said valving elements includes a solid sphere.

28. The check valve of claim 6, wherein at least one of said valving elements includes a spherical float.

29. The check valve of claim 6, wherein at least one of said valving elements is a sphere which has a tendency to sink in water.

* * * * *